(12) United States Patent
Wu et al.

(10) Patent No.: US 12,314,869 B2
(45) Date of Patent: May 27, 2025

(54) ELECTRONIC DEVICE AND METHOD OF FILTERING DISPATCHING RULES FOR WORKSTATION

(71) Applicant: Industrial Technology Research Institute, Hsinchu (TW)

(72) Inventors: Tung-Han Wu, Taichung (TW); Ching-Fang Shao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 833 days.

(21) Appl. No.: 17/551,201

(22) Filed: Dec. 15, 2021

(65) Prior Publication Data

US 2023/0137363 A1 May 4, 2023

(30) Foreign Application Priority Data

Oct. 28, 2021 (TW) .................. 110140155

(51) Int. Cl.
*G06F 9/48* (2006.01)
*G05B 19/418* (2006.01)
(Continued)

(52) U.S. Cl.
CPC ....... *G06N 5/025* (2013.01); *G05B 19/41865* (2013.01); *G05B 19/41885* (2013.01); *G06N 5/022* (2013.01); *G05B 2219/31449* (2013.01)

(58) Field of Classification Search
CPC ...... G06F 1/329; G06F 9/4843; G06F 9/4881; G06F 9/4887; G06F 9/5038; G06F 9/52;
(Continued)

(56) References Cited

U.S. PATENT DOCUMENTS

| 9,425,636 B2 | 8/2016 | Taniguchi |
| 10,365,638 B2 | 7/2019 | Jan |

(Continued)

FOREIGN PATENT DOCUMENTS

| CN | 101599026 | 12/2009 |
| CN | 101493857 | 8/2010 |

(Continued)

OTHER PUBLICATIONS

Ahmed El-Bouri et al., "A neural network for dispatching rule selection in a job shop," The International Journal of Advanced Manufacturing Technology, vol. 31, May 2006, pp. 342-349.
(Continued)

*Primary Examiner* — Andy Ho
(74) *Attorney, Agent, or Firm* — JCIPRNET

(57) ABSTRACT

An electronic device and a method of filtering dispatching rules for a workstation are provided. The method includes the following. A dispatch rule set including a first dispatching rule and a first test data set are obtained. An initial individual is generated according to the dispatch rule set based on a genetic algorithm. A first individual is generated according to the first test data set and the initial individual based on the genetic algorithm, and the first individual includes a first dispatching rule sequence corresponding to a first workstation, and the first dispatching rule sequence includes a first dispatching rule. A first score corresponding to the first dispatching rule is calculated according to a first order of the first dispatching rule in the first dispatching rule sequence, and the dispatching rule set is updated according to the first score. The dispatching rule set that is updated is output.

18 Claims, 3 Drawing Sheets

(51) Int. Cl.
*G06N 5/022* (2023.01)
*G06N 5/025* (2023.01)

(58) Field of Classification Search
CPC ... G06F 9/526; G06F 9/528; G06F 2209/5021
See application file for complete search history.

(56) References Cited

U.S. PATENT DOCUMENTS

| | | |
|---|---|---|
| 11,032,392 B1 | 6/2021 | Gabrielson |
| 2017/0109205 A1 | 4/2017 | Ahuja et al. |
| 2018/0113742 A1 | 4/2018 | Chung et al. |
| 2020/0019435 A1 | 1/2020 | Stevenson et al. |
| 2020/0202232 A1* | 6/2020 | Nagahara ....... G06Q 10/063114 |
| 2021/0165395 A1 | 6/2021 | Hsieh et al. |

FOREIGN PATENT DOCUMENTS

| | | |
|---|---|---|
| CN | 105045243 | 8/2017 |
| CN | 111415069 | 7/2020 |
| CN | 111507641 | 8/2020 |
| CN | 112131761 | 12/2020 |
| CN | 112862331 | 5/2021 |
| TW | 583560 | 4/2004 |
| TW | M567403 | 9/2018 |
| TW | M591660 | 3/2020 |

OTHER PUBLICATIONS

"Office Action of Taiwan Counterpart Application", issued on Jan. 5, 2023, p. 1-p. 3.

* cited by examiner

ELECTRONIC DEVICE AND METHOD OF FILTERING DISPATCHING RULES FOR WORKSTATION

CROSS-REFERENCE TO RELATED APPLICATION

This application claims the priority benefit of Taiwan application serial no. 110140155, filed on Oct. 28, 2021. The entirety of the above-mentioned patent application is hereby incorporated by reference herein and made a part of this specification.

TECHNICAL FIELD

The disclosure relates to an electronic device and a method of filtering dispatching rules for a workstation.

BACKGROUND

In order to improve product production performance and increase corporate competitiveness, production line automation has become an inevitable trend. With the development of artificial intelligence technology, more and more manufacturers are applying artificial intelligence technology to production line automation to optimize the production efficiency of the production line, and to use artificial intelligence technology to select dispatching rules for a workstation. However, due to factors such as different industrial environments, different production lines may have different manufacturing processes or require different machines. Therefore, the dispatching rules for workstations of different production lines are not the same. Failure to select an appropriate number of dispatching rules for a production line to train an artificial intelligence model results in poor performance of a trained artificial intelligence model or increase the cost of training the model. Therefore, proposing a dispatching rule recommendation method that may be applied to different industrial environments is an important issue in the field.

SUMMARY

The disclosure provides an electronic device and a method of filtering dispatching rules for a workstation, which select suitable dispatching rules for the workstation based on a genetic algorithm (GA) to improve the scheduling efficiency of the workstation.

An electronic device of filtering dispatching rules for a workstation of the disclosure includes a processor, a storage medium, and a transceiver. The storage medium stores multiple modules and a dispatch rule set including a first dispatching rule. The processor is coupled to the storage medium and the transceiver, and accesses and executes the modules, and the modules include a data obtaining module, a multi-level dispatching rule creation module, an evolution module, a rule block filtering module, and a dispatching rule recommendation module. The data obtaining module receives a first test data set through the transceiver. The multi-level dispatching rule creation module generates an initial individual according to the dispatch rule set based on a genetic algorithm. The evolution module generates a first individual according to the first test data set and the initial individual based on the genetic algorithm, and the first individual includes a first dispatching rule sequence corresponding to a first workstation, and the first dispatching rule sequence includes the first dispatching rule. The rule block filtering module calculates a first score corresponding to the first dispatching rule according to a first order of the first dispatching rule in the first dispatching rule sequence, and updates the dispatch rule set according to the first score. The dispatching rule recommendation module outputs the dispatch rule set that is updated through the transceiver.

A method of filtering dispatching rules for a workstation of the disclosure includes the following. A dispatch rule set including a first dispatching rule and a first test data set are obtained. An initial individual is generated according to the dispatch rule set based on a genetic algorithm. A first individual is generated according to the first test data set and the initial individual based on the genetic algorithm, and the first individual includes a first dispatching rule sequence corresponding to a first workstation, and the first dispatching rule sequence includes the first dispatching rule. A first score corresponding to the first dispatching rule is calculated according to a first order of the first dispatching rule in the first dispatching rule sequence, and the dispatch rule set is updated according to the first score. The dispatch rule set that is updated is output.

Based on the above, the electronic device of the disclosure selects or recommends an applicable dispatch rule set for multiple workstations on the production line according to the genetic algorithm. The user assigns dispatching rules to workstations according to the dispatch rule set recommended by the electronic device to optimize production line scheduling.

DETAILED DESCRIPTION

Figure 1:
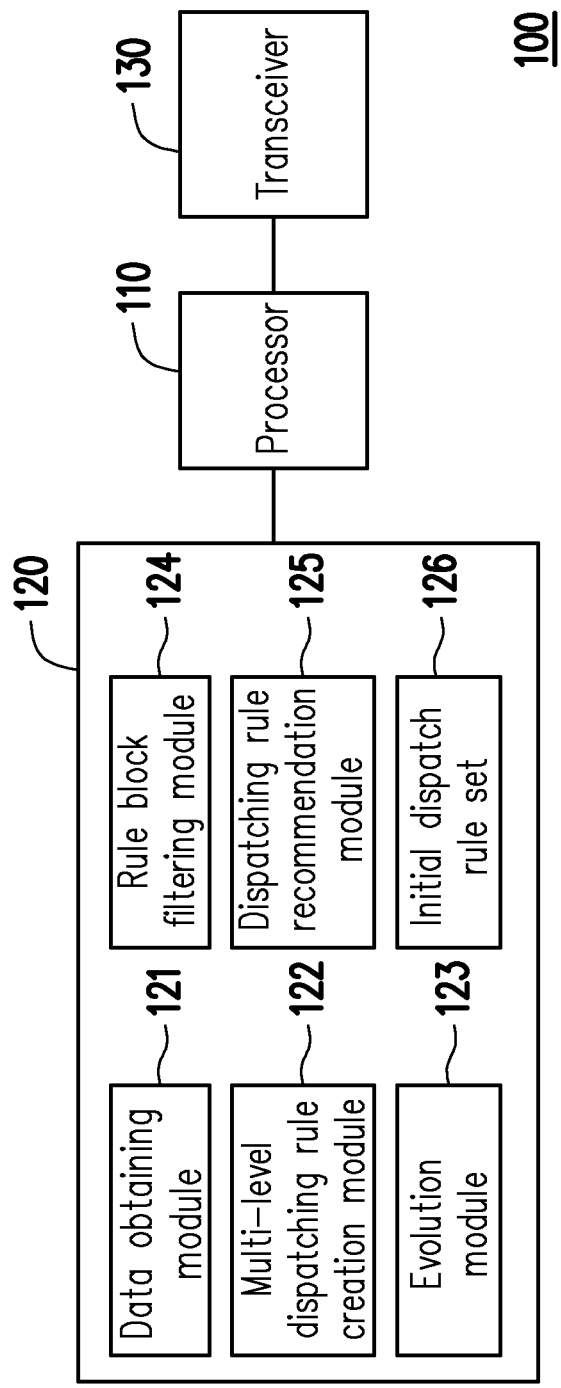
FIG. 1 illustrates a schematic diagram of an electronic device of filtering dispatching rules for a workstation according to an embodiment of the disclosure.

To provide a further understanding of the content of the disclosure, embodiments as examples of how this disclosure may be implemented are described below. In addition, wherever possible, elements/components/steps with the same reference numeral in the drawings and embodiments represent the same or similar components.

FIG. 1 illustrates a schematic diagram of an electronic device of filtering dispatching rules for a workstation according to an embodiment of the disclosure. The electronic device 100 may include a processor 110, a storage medium 120, and a transceiver 130.

The processor 110 is, for example, a central processing unit (CPU), or other programmable general-purpose or special-purpose elements including a micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements or a combination of the above elements. The processor 110 may be coupled to the storage medium 120 and the transceiver 130, and access and execute a plurality of modules and various applications stored in the storage medium 120.

The storage medium 120 is, for example, any type of fixed or removable element including a random access memory (RAM), a read-only memory (ROM), a flash memory, a hard disk drive (HDD), a solid state drive (SSD), or a similar element or a combination of the above elements, and is used for storing a plurality of modules or various applications that may be executed by the processor 110. In this embodiment, the storage medium 120 may store a plurality of modules such as a data obtaining module 121, a multi-level dispatching rule creation module 122, an evolution module 123, a rule block filtering module 124, and a dispatching rule recommendation module 125, and functions thereof will be described later. In addition, the storage medium 120 may further store a dispatch rule set 126 that includes a plurality of dispatching rules. Table 1 is an example of dispatching rules. The initial dispatch rule set 126 may include 20 dispatching rules as shown in Table 1, but the disclosure is not limited thereto. For example, the dispatch rule set 126 may further include "Dispatching rule RANDOM" representing a random dispatch.

TABLE 1

| Dispatching rule | Description |
| --- | --- |
| LWIP | The higher the water level before the workstation point, the more priority to being dispatched |
| SWIP | The lower the water level before the workstation point, the more priority to being dispatched |
| HCM | The more processes a machine may execute, the more priority to being used |
| LCM | The fewer processes a machine may execute, the more priority to being used |
| LPT | The longer the working hours, the more priority |
| SPT | The shorter the working hours, the more priority |
| FOPNR | The less the number of remaining processes, the more priority |
| MOPNR | The more the number of remaining processes, the more priority |
| NINQ | The fewer remaining processes the machine may execute, the more priority to being used |
| WINQ | The shorter the online waiting time of the machine where this process is located, the more priority |
| FIFO | The earlier a process starts, the more priority |
| FILO | The later a process starts, the more priority |
| FMRT | The earlier the release time of the machine used in this process, the higher the priority |
| LMRT | The later the release time of the machine used in this process, the higher the priority |
| LWKR | The one with the least total working hours of the remaining processes has priority |
| LMT | The one with the largest product of the working hours of this process and total working hours has priority |
| SMT | The one with the smallest product of the working hours of this process and total working hours has priority |
| TWORK | The one with the least total working hours has priority |
| LDT | The one with the working hours of this process accounting for the largest proportion of the total working hours has priority |
| SSO | The one with the shortest working hours of the next process has priority |

The transceiver 130 transmits and receives signals in a wireless or wired manner. The transceiver 130 may further execute operations such as low noise amplification, impedance matching, frequency mixing, up or down frequency conversion, filtering, amplification, and the like.

In order to recommend a suitable dispatching rule for a workstation on the production line, the data obtaining module 121 may receive a plurality of test data sets collected from the production line through the transceiver 130. The test data set may include a plurality of work orders, and each work order may include workstation scheduling associated with a plurality of workstations. Workstation scheduling may include information such as the machines of workstations or process working hours. Table 2 is an example of two work orders.

TABLE 2

| Work order #1 | Machine #11 (83 minutes) > Machine #7 (59 minutes) > . . . > Machine #10 (58 minutes) |
| --- | --- |
| Work order #2 | Machine #1 (11 minutes) > Machine #14 (67 minutes) > . . . > Machine #3 (9 minutes) |

After the test data sets are obtained, the multi-level dispatching rule creation module 122 may generate an initial individual (or referred to as an initial chromosome) for each of the test data sets. Taking a first test data set among the test data sets as an example, the multi-level dispatching rule creation module 122 may generate one or more initial individuals according to the dispatch rule set 126 based on the genetic algorithm. The initial individual may include a plurality of genes respectively corresponding to a plurality of workstations, and each gene may include a dispatching rule sequence. The dispatching rule sequence may include one or more dispatching rules arranged in sequence. In other words, each workstation may be assigned a plurality of dispatching rules.

Table 3 is an example of initial individuals corresponding to 3 workstations (that is, assuming there are 3 workstations on the production line). The dispatching rule sequence corresponding to Workstation #1 (or referred to as a first workstation) may include "Dispatching rule LWIP", "Dispatching rule MOPNR" and "Dispatching rule NINQ" arranged in sequence. The dispatching rule sequence corresponding to Workstation #2 (or referred to as a second workstation) may include "Dispatching rule LWIP" and "Dispatching rule FOPNR" arranged in sequence. The dispatching rule sequence corresponding to Workstation #3 may include "Dispatching rule LPT" and "Dispatching rule NINQ" arranged in sequence.

TABLE 3

| Workstation #1 | Workstation #2 | Workstation #3 |
| --- | --- | --- |
| LWIP | LWIP | LPT |
| MOPNR | FOPNR | NINQ |
| NINQ | | |

In an embodiment, the data obtaining module 121 may obtain available resource information collected from the production line through the transceiver 130. The available resource information may include available workstations, available dispatching rules of the workstations, or information such as process working hours. The multi-level dispatching rule creation module 122 may generate one or more initial individuals for the first test data set according to available resource information.

After the multi-level dispatching rule creation module 122 generates one or more initial individuals for the first test data set, the evolution module 123 may generate one or more first individuals based on the genetic algorithm according to the first test data set and the initial individual. That is, the initial individual is the paternal generation of the first individual, and the first individual is the offspring of the first generation of the initial individual. Similar to the initial individual, the first individual may include a plurality of genes respectively corresponding to a plurality of workstations, and each gene may include a dispatching rule sequence.

Figure 2:
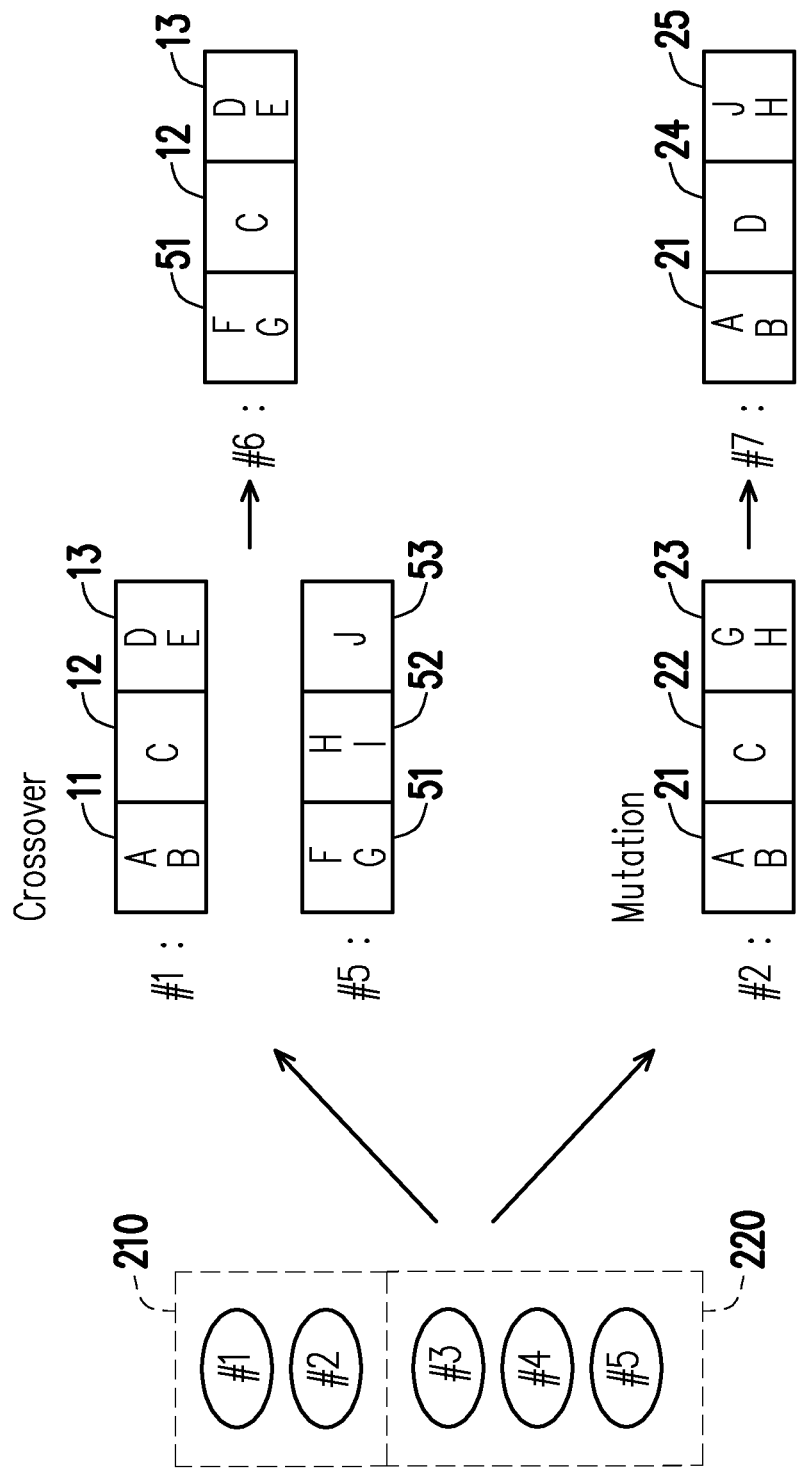
FIG. 2 illustrates a schematic diagram of generating individuals based on a genetic algorithm according to an embodiment of the disclosure.

The evolution module 123 may update at least one of the genes in the initial individual according to the genetic algorithm to generate the first individual. FIG. 2 illustrates a schematic diagram of generating individuals based on a genetic algorithm according to an embodiment of the disclosure. The evolution module 123 may allocate a plurality of initial individuals to a first individual set 210 corresponding to high fitness or an individual set (or referred to as a second individual set) 220 corresponding to low fitness. Specifically, the evolution module 123 may output the initial individual through the transceiver 130. Next, the evolution module 123 may receive the fitness corresponding to the output initial individual through the transceiver 130. If the fitness of the initial individual is greater than a fitness threshold value, the evolution module 123 may allocate the initial individual to the first individual set 210 corresponding to the high fitness. If the fitness of the initial individual is less than or equal to the fitness threshold value, the evolution module 123 may allocate the initial individual to the second individual set 220 corresponding to the low fitness.

For example, the user may configure dispatching rules for a plurality of workstations on the production line according to the initial individual output by the evolution module 123, and record the resources consumed by the configured production line, and the resources include, for example, the total consumption of working hours of the production line. The lower the total working hours, the higher the fitness of the initial individual. The higher the total working hours, the lower the fitness of the initial individual. The user may feed the fitness corresponding to the initial individual back to evolution module 123.

In an embodiment, it is assumed that a plurality of initial individuals generated by the multi-level dispatching rule creation module 122 include an initial individual allocated to the first individual set 210 and a second initial individual allocated to the second individual set 220. The evolution module 123 may select the initial individual from the first individual set 210, and may select the second initial individual from the second individual set 220. The evolution module 123 may perform crossover on the selected initial individual and the second initial individual to update one or more genes on the initial individual to generate the first individual. In other words, the paternal generation of the first individual may include the initial individual with high fitness and the second initial individual with low fitness.

Taking FIG. 2 as an example, it is assumed that the first individual set 210 includes an initial individual #1 and an initial individual #2, and the second individual set 220 includes an initial individual #3, an initial individual #4, and an initial individual #5. The evolution module 123 may select the initial individual #1 from the first individual set 210 and the initial individual #5 from the second individual set 220. The initial individual #1 may include a gene 11 corresponding to the workstation #1, a gene 12 corresponding to the workstation #2, and a gene 13 corresponding to the workstation #3. The dispatching rule sequence in the gene 11 includes "Dispatching rule A" and "Dispatching rule B", the dispatching rule sequence in the gene 12 includes "Dispatching rule C", and the dispatching rule sequence in the gene 13 includes "Dispatching rule D" and "Dispatching rule E". The initial individual #5 may include a gene 51 corresponding to the workstation #1, a gene 52 corresponding to the workstation #2, and a gene 53 corresponding to the workstation #3. The dispatching rule sequence in the gene 51 includes "Dispatching rule F" and "Dispatching rule G", the dispatching rule sequence in the gene 52 includes "Dispatching rule H" and "Dispatching rule I", and the dispatching rule sequence in the gene 53 includes "Dispatching rule J".

The evolution module 123 may perform crossover on the initial individual #1 and the initial individual #5 to update the gene 11 on the initial individual #1. In the evolution module 123, the gene 51 on the initial individual #5 corresponding to the workstation #1 may be used to replace the gene 11 on the initial individual #1 to generate an individual #6. The individual #6 may include the gene 51 corresponding to the workstation #1, the gene 12 corresponding to the workstation #2, and the gene 13 corresponding to the workstation #3.

In an embodiment, the evolution module 123 may perform mutation on one or more genes on the initial individual according to the genetic algorithm to update one or more dispatching rules in the gene of the initial individual, thereby generating the first individual. Taking FIG. 2 as an example, it is assumed that the initial individual #2 may include a gene 21 corresponding to the workstation #1, a gene 22 corresponding to the workstation #2, and a gene 23 corresponding to the workstation #3. The dispatching rule sequence in the gene 21 includes "Dispatching rule A" and "Dispatching rule B", the dispatching rule sequence in the gene 22 includes "Dispatching rule C", and the dispatching rule sequence in the gene 23 includes "Dispatching rule G" and "Dispatching rule H".

The evolution module 123 may perform mutation on the gene 22 or the gene 23 on the initial individual #2 to update the gene 22 or the gene 23, thereby generating an individual #7. The individual #7 may include the gene 21 corresponding to the workstation #1, a gene 24 corresponding to the workstation #2, and a gene 25 corresponding to the workstation #3. The gene 24 is generated by mutation of the gene 22, and the dispatching rule sequence in the gene 24 contains "Dispatching rule D". The gene 25 is generated by mutation of the gene 23, and the dispatching rule sequence in the gene 25 contains "Dispatching rule J" and "Dispatching rule H".

After the evolution module 123 updates the gene in the initial individual according to the genetic algorithm to generate the first individual (that is, a first offspring), the evolution module 123 may update the gene in the first individual to generate a second offspring based on a method similar to the embodiment in FIG. 2. By analogy, the evolution module 123 may generate a plurality of individuals of different generations according to the initial individual. The rule block filtering module 124 may select an individual from the individuals, and perform scoring on the dispatching rule according to the selected individual. In an embodiment, the rule block filtering module 124 may calculate the fitness of each of the individuals according to the first test data set, and select an optimal individual from the individuals according to the fitnesses. The rule block filtering module 124 may perform scoring on the dispatching rule according to the selected optimal individual. In an embodiment, the dispatching rule recommendation module 125 may output the selected optimal individual through the transceiver 130 for the user's reference.

Specifically, it is assumed that the rule block filtering module 124 selects the first individual. The rule block filtering module 124 may perform scoring on the dispatching rule according to the first individual, and the first individual may include a plurality of dispatching rule sequences (for example, a first dispatching rule sequence or a second dispatching rule sequence) respectively corresponding to a plurality of workstations (for example, the workstation #1 or the workstation #2). The rule block filtering module 124 may, according to the order of a specific dispatching rule (for example, a first dispatching rule or a second dispatching rule) in each of the dispatching rule sequences, calculate the score corresponding to the specific dispatching rule. The higher the order of a specific dispatching rule, the higher the priority and score of the specific dispatching rule. In other words, the score of the dispatching rule may be related to the order of the dispatching rule in the dispatching rule sequence, and the score of the dispatching rule may be related to different genes (that is, different dispatching rule sequences) on the first individual.

Table 4 is an example of the first individual (or the optimal individual) selected by the rule block filtering module 124. The first individual includes the first dispatching rule sequence corresponding to the workstation #1, the second dispatching rule sequence corresponding to the workstation #2, and a third dispatching rule sequence corresponding to the workstation #3. The rule block filtering module 124 may assign weights to each order in the dispatching rule sequence. For example, if the dispatching rule is in the first order in the dispatching rule sequence, the dispatching rule may get 4 points. If the dispatching rule is located in the second order in the dispatching rule sequence, the dispatching rule may get 3 points. If the dispatching rule is located in the third order in the dispatching rule sequence, the dispatching rule may get 2 points. If the dispatching rule is located in the fourth order in the dispatching rule sequence, the dispatching rule may get 1 point. In this way, the rule block filtering module 124 may calculate the score for each dispatching rule, as shown in Table 5.

TABLE 4

| Workstation #1 | Workstation #2 | Workstation #3 |
|---|---|---|
| SWIP | LPT | FOPNR |
| SPT | | NINQ |
| | | SPT |
| | | LCM |

TABLE 5

| Dispatching rule | Order in workstation #1 | Order in workstation #2 | Order in workstation #3 | Score |
|---|---|---|---|---|
| SWIP | 1 (4 points) | N/A | N/A | 4 |
| SPT | 2 (3 points) | N/A | 3 (2 points) | 3 + 2 = 5 |
| LPT | N/A | 1 (4 points) | N/A | 4 |
| FOPNR | N/A | N/A | 1 (4 points) | 4 |
| NINQ | N/A | N/A | 2 (3 points) | 3 |
| LCM | N/A | N/A | 4 (1 point) | 1 |

After the score for each dispatching rule is obtained, the rule block filtering module 124 may remove the dispatching rule with a lower score from the first individual to update the first individual, and may output the updated first individual through the transceiver 130 for the user's reference. Taking Tables 4 and 5 as examples, the rule block filtering module 124 may remove "Dispatching rule LCM" corresponding to the smallest score from the first individual in Table 4, thereby generating the updated first individual shown in Table 6. The rule block filtering module 124 may output the updated first individual for the user's reference.

TABLE 6

| Workstation #1 | Workstation #2 | Workstation #3 |
|---|---|---|
| SWIP | LPT | FOPNR |
| SPT | | NINQ |
| | | SPT |
| | | ~~LCM~~ |

It is worth noting that after the rule block filtering module 124 determines the specific dispatching rule to be removed from the first individual according to the score, if the dispatching rule sequence in the first individual only contains the specific dispatching rule to be removed, the rule block filtering module 124 may use another dispatching rule (that is, a dispatching rule that is different from the specific dispatching rule) in the dispatch rule set 126 to replace the specific dispatching rule, thereby removing the specific dispatching rule from the dispatching rule sequence. Taking the first individual in Table 4 as an example, it is assumed that "Dispatching rule LPT" has the smallest score. Since the second dispatching rule sequence corresponding to the workstation #2 only contains "Dispatching rule LPT", the rule block filtering module 124 may use another dispatching rule (that is, a dispatching rule different from "Dispatching rule LPT") in the dispatch rule set 126 to replace "Dispatching rule LPT" to update the second dispatching rule sequence.

On the other hand, after the score of each dispatching rule is obtained, the rule block filtering module 124 may remove the dispatching rule with a lower score from the dispatch rule set 126 to update the dispatch rule set 126, and output the updated dispatch rule set 126 through the transceiver 130 for the user's reference. Next, the multi-level dispatching rule creation module 122 may generate a new initial individual according to the updated dispatch rule set 126 based on the genetic algorithm. The evolution module 123 may generate a new first individual based on the new initial individual. The rule block filtering module 124 may calculate the score for each dispatching rule in the dispatch rule set 126 according to the new first individual, and remove the dispatching rule with a lower score from the dispatch rule set 126 to update the dispatch rule set 126 again. As such, the dispatch rule set 126 is updated repeatedly, and the number of dispatching rules in the dispatch rule set 126 decreases. The electronic device 100 may repeatedly update the dispatch rule set 126 until the number of dispatching rules in the dispatch rule set 126 is equal to zero.

Taking Table 5 as an example, it is assumed that the rule block filtering module 124 removes two dispatching rules with the lowest scores in one update of the dispatch rule set 126. When the dispatch rule set 126 is updated for the first time, the rule block filtering module 124, in response to the score of "Dispatching rule LCM" being the lowest score among all the scores in Table 5, may remove "Dispatching rule LCM" from the dispatch rule set 126. Next, the rule block filtering module 124 may, in response to the score of "Dispatching rule NINQ" being the second lowest score among all the scores in Table 5, remove "Dispatching rule NINQ" from the dispatch rule set 126. After "Dispatching rule LCM" and "Dispatching rule NINQ" are removed from the dispatch rule set 126, the rule block filtering module 124 may complete the first update of the dispatch rule set 126. The dispatching rule recommendation module 125 may output the updated dispatch rule set 126 through the transceiver 130 for the user's reference. Since in the update process of the dispatch rule set 126, the number of dispatching rules may be significantly reduced, the user may perform scheduling for workstations on the production line according to fewer dispatching rules. Accordingly, the performance of the production line may be improved and the complexity of scheduling may be reduced.

The rule block filtering module 124 may select the optimal individual from a plurality of individuals based on the updated dispatch rule set 126. The individual may include the initial individual generated by the multi-level dispatching rule creation module 122 according to the first test data set or the individual generated after the evolution module 123 performs crossover or mutation. The dispatching rule recommendation module 125 may output the optimal individual through the transceiver 130 for the user's reference.

The rule block filtering module 124 may generate the optimal individual for the first test data set according to the initial dispatch rule set 126, and the optimal individual is also referred to as a local optimal individual. After the rule block filtering module 124 removes the dispatching rule (for example, the first dispatching rule) from the initial dispatch rule set 126 to update the dispatch rule set 126, the rule block filtering module 124 may increase the count value corresponding to the removed dispatching rule. Updating the dispatch rule set 126 may generate a dispatching rule subset (that is, the updated dispatch rule set 126). The rule block filtering module 124 may generate another local optimal individual for the first test data set according to the dispatching rule subset. The electronic device 100 may perform a plurality of updates for the dispatch rule set 126 until the number of dispatching rules in the dispatch rule set 126 is equal to zero. After the updates of the dispatch rule set 126 are completed, the rule block filtering module 124 may obtain a plurality of local optimal individuals, and the local optimal individuals may include the local optimal individual corresponding to the initial dispatch rule set 126, and may include the local optimal individual corresponding to each dispatching rule subset.

In each update of the dispatch rule set 126, the rule block filtering module 124 may increase the count value (increase the count value by one) for the dispatching rule that is removed. After the updates of the dispatch rule set 126 are completed, that is, after the number of dispatching rules in the dispatch rule set 126 is equal to zero, the rule block filtering module 124 may generate a plurality of local optimal individuals, and may calculate the count value of each dispatching rule. The rule block filtering module 124 may, in response to the Nth local optimum individual corresponding to the Nth update among the local optimum individuals being a global optimum individual (that is, the optimum individual among all the local optimum individuals), decrease the count value corresponding to the Mth update (decrease the count value of the dispatching rule removed at the Mth update by one), where N and M are positive integers and M is greater than N.

TABLE 7

| | The i-th update of the dispatch rule set 126 | | | | |
|---|---|---|---|---|---|
| i | 0 | 1 | 2 | 3 | 4 |
| Fitness | 20 | 30 | 50 | 60 | 90 |
| Deleted dispatching rule | LWIP SSO | SWIP LDT | HCM TWORK | LCM SMT | LPT LMT |

TABLE 7-continued

| i | 5 | 6 | 7 | 8 | 9 |
|---|---|---|---|---|---|
| Fitness | 65 | 75 | 120 | 100 | 80 |
| Deleted dispatching rule | SPT LWKR | FOPNR LMRT | MOPNR FMRT | NINQ FILO | WINQ FIFO |
| | | First test data | | | |

Taking Table 7 as an example, Table 7 shows the fitness of the local optimal individual corresponding to the dispatching rule subset generated by the i-th update of dispatch rule set 126, and the case of (i=0) represents the dispatch rule set 126 that is not updated (that is, the initial dispatch rule set 126). In this embodiment, it is assumed that the initial dispatch rule set 126 includes 20 kinds of dispatching rules as shown in Table 1, and the rule block filtering module 124 removes two dispatching rules from the dispatch rule set 126 in each update of the dispatch rule set 126.

When the dispatch rule set 126 is not updated, the rule block filtering module 124 may calculate the fitness of each of a plurality of individuals according to the first test data set, and select the local optimal individual from the individuals according to the fitnesses. The fitness of the local optimal individual is 20.

Next, the rule block filtering module 124 may remove "Dispatching rule LWIP" and "Dispatching rule SSO" from the initial dispatch rule set 126, so as to complete the initial update of the dispatch rule set 126. When removing "Dispatching rule LWIP" and "Dispatching rule", the rule block filtering module 124 may increase the count value of "Dispatching rule LWIP" and the count value of "Dispatching rule SSO". After completing the initial update of the dispatch rule set 126, the rule block filtering module 124 may calculate the fitness of each of a plurality of individuals according to the updated dispatch rule set 126 and the first test data set, and select the local optimal individual from the individuals according to the fitnesses. The fitness of the local optimal individual is 30.

By analogy, after 9 updates, the number of dispatching rules in the dispatch rule set 126 is equal to zero. The rule block filtering module 124 may stop updating the dispatch rule set 126 and obtain the information shown in Table 7. The rule block filtering module 124 may, in response to the 7th local optimal individual corresponding to the 7th update among the 10 local optimal individuals having the highest fitness, determine that the 7th local optimal individual is the global optimal individual. The rule block filtering module 124 may, in response to the seventh local optimal individual being the global optimal individual, reduce the count values corresponding to the 8th to 9th updates; that is, the rule block filtering module 124 may reduce the count value of "Dispatching rule NINQ", the count value of "Dispatching rule FILO", the count value of "Dispatching rule WINQ", and the count value of "Dispatching rule FIFO". Finally, the rule block filtering module 124 may obtain the statistical result of the count values shown in Table 8 according to the first test data set. Based on a similar method, the rule block filtering module 124 may obtain the statistical result of a plurality of count values according to a plurality of test data sets. The rule block filtering module 124 may add a plurality of count values respectively corresponding to the specific dispatching rules of a plurality of test data sets to obtain the sum of the count values of the specific dispatching rules, as shown in Table 9.

TABLE 8

| Dispatching rule | Count value |
| --- | --- |
| LWIP | 1 |
| SWIP | 1 |
| HCM | 1 |
| LCM | 1 |
| LPT | 1 |
| SPT | 1 |
| FOPNR | 1 |
| MOPNR | 1 |
| NINQ | 0 |
| WINQ | 0 |
| FIFO | 0 |
| FILO | 0 |
| FMRT | 1 |
| LMRT | 1 |
| LWKR | 1 |
| LMT | 1 |
| SMT | 1 |
| TWORK | 1 |
| LDT | 1 |
| SSO | 1 |

TABLE 9

| Dispatching rule | Count value |
| --- | --- |
| LWIP | 39 |
| SWIP | 38 |
| HCM | 38 |
| LCM | 35 |
| LPT | 37 |
| SPT | 34 |
| FOPNR | 35 |
| MOPNR | 32 |
| NINQ | 32 |
| WINQ | 31 |
| FIFO | 28 |
| FILO | 28 |
| FMRT | 25 |
| LMRT | 25 |
| LWKR | 23 |
| LMT | 17 |
| SMT | 18 |
| TWORK | 7 |
| LDT | 14 |
| SSO | 13 |

The dispatching rule recommendation module 125 selects one or more dispatching rules with smaller count values from the initial dispatch rule set 126 as recommended dispatching rules. The dispatching rule recommendation module 125 may output the recommend dispatching rule(s) through the transceiver 130 for user's reference for scheduling workstations. Taking Table 9 as an example, it is assumed that the electronic device 100 intends to generate three recommended dispatching rules. The dispatching rule recommendation module 125 may, in response to the count value of "Dispatching rule TWORK" being less than the other count values in Table 9, set "Dispatching rule TWORK" as the recommended dispatching rule. The dispatching rule recommendation module 125 may, in response to the count value of "Dispatching rule SSO" being less than the other count values (that is, all count values except for the count value of "Dispatching rule TWORK") in Table 9, set "Dispatching rule SSO" as the recommended dispatching rule. The dispatching rule recommendation module 125 may, in response to the count value of "Dispatching rule LDT" being less than the other count values (that is, all count values except for the count value of "Dispatching rule TWORK" and the count value of "Dispatching rule SSO") in Table 9, set "Dispatching rule LDT" as the recommended dispatching rule.

Figure 3:
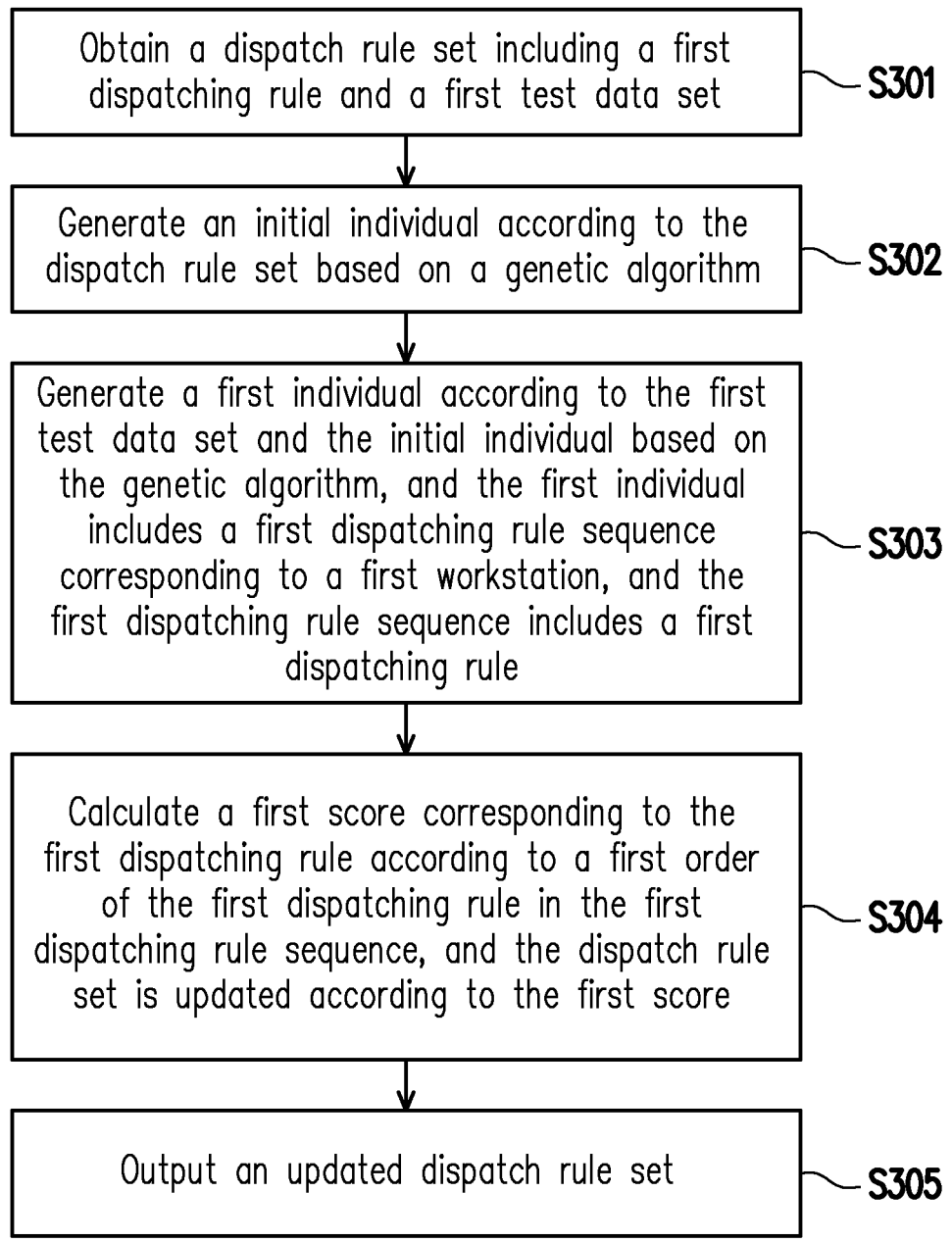
FIG. 3 illustrates a flow chart of a method of filtering dispatching rules for a workstation according to an embodiment of the disclosure.

FIG. 3 illustrates a flow chart of a method of filtering dispatching rules for a workstation according to an embodiment of the disclosure, and the method may be implemented by the electronic device 100 as shown in FIG. 1. In step S301, a dispatch rule set including a first dispatching rule and a first test data set are obtained. In step S302, an initial individual is generated according to the dispatch rule set based on a genetic algorithm. In step S303, a first individual is generated according to the first test data set and the initial individual based on the genetic algorithm, and the first individual includes a first dispatching rule sequence corresponding to a first workstation, and the first dispatching rule sequence includes a first dispatching rule. In step S304, a first score corresponding to the first dispatching rule is calculated according to a first order of the first dispatching rule in the first dispatching rule sequence, and the dispatch rule set is updated according to the first score. In step S305, an updated dispatch rule set is output.

In summary, the electronic device of the disclosure may select or recommend the applicable dispatching rule for a plurality of workstations on the production line according to the genetic algorithm. The electronic device may create the individual corresponding to the workstations, and the individual may include the dispatching rule sequence related to the workstation, and the dispatching rule sequence may include a plurality of dispatching rules. The electronic device may perform scoring on the dispatching rule according to the order of the dispatching rule in the dispatching rule sequence, and determine whether the dispatching rule is suitable for the production line according to the score and generate the determination result. After using a plurality of test data sets to generate a plurality of determination results, the electronic device may select the dispatching rule that may significantly improve the efficiency of the workstation according to the determination results. The user may optimize the scheduling of the production line according to the dispatching rule recommended by the electronic device.

What is claimed is:

1. An electronic device of filtering dispatching rules for a workstation, comprising:
    a transceiver;
    a storage medium, storing a plurality of modules and a dispatch rule set comprising a first dispatching rule; and
    a processor, coupled to the storage medium and the transceiver, accessing and executing the modules, wherein the modules comprise:
        a data obtaining module, receiving a first test data set through the transceiver;
        a multi-level dispatching rule creation module, generating an initial individual according to the dispatch rule set based on a genetic algorithm and;
        an evolution module, generating a first individual according to the first test data set and the initial individual based on the genetic algorithm, wherein the first individual comprises a first dispatching rule sequence corresponding to a first workstation, wherein the first dispatching rule sequence comprises the first dispatching rule;
        a rule block filtering module, calculating a first score corresponding to the first dispatching rule according to a first order of the first dispatching rule in the first dispatching rule sequence, updating the dispatch rule set according to the first score; and
        a dispatching rule recommendation module, outputting the dispatch rule set that is updated through the transceiver.

2. The electronic device according to claim 1, wherein the dispatch rule set further comprises a second dispatching rule corresponding to a second score, wherein the rule block filtering module, in response to the first score being less than the second score, removes the first dispatching rule from the dispatch rule set to update the dispatch rule set.

3. The electronic device according to claim 2, wherein the rule block filtering module, in response to removing the first dispatching rule from the dispatch rule set, increases a first count value corresponding to the first dispatching rule.

4. The electronic device according to claim 3, wherein the rule block filtering module, in response to removing the second dispatching rule from the dispatch rule set that is updated, increases a second count value corresponding to the second dispatching rule.

5. The electronic device according to claim 3, wherein the data obtaining module receives a plurality of test data sets comprising the first test data set through the transceiver, wherein the first count value is a sum of a plurality of count values respectively corresponding to the test data sets.

6. The electronic device according to claim 5, wherein the second dispatching rule corresponds to a second count value, wherein the dispatching rule recommendation module, in response to the first count value being less than the second count value, selects the first dispatching rule from the first dispatching rule and the second dispatching rule as a recommended dispatching rule, wherein the dispatching rule recommendation module outputs the recommended dispatching rule through the transceiver.

7. The electronic device according to claim 6, wherein the rule block filtering module performs a plurality of updates for the dispatch rule set to generate a plurality of dispatching rule subsets, and generates a plurality of local optimal individuals according to the dispatch rule set and the dispatching rule subsets, wherein the rule block filtering module, in response to an Nth local optimal individual corresponding to an Nth update among the local optimal individuals being a global optimal individual, reduces the first count value corresponding to an Mth update, wherein N and M are positive integers and M is greater than N.

8. The electronic device according to claim 2, wherein the rule block filtering module, in response to the first dispatching rule sequence only comprising the first dispatching rule, uses another dispatching rule in the dispatch rule set to replace the first dispatching rule to remove the first dispatching rule from the first dispatching rule sequence.

9. The electronic device according to claim 2, wherein the rule block filtering module removes the second dispatching rule from the dispatch rule set that is updated to update the dispatch rule set again.

10. The electronic device according to claim 1, wherein the first individual further comprises a second dispatching rule sequence corresponding to a second workstation, wherein the second dispatching rule sequence comprises the first dispatching rule, wherein the rule block filtering module calculates the first score according to a second order of the first dispatching rule in the second dispatching rule sequence.

11. The electronic device according to claim 1, wherein the dispatching rule recommendation module outputs an optimal individual generated based on the dispatch rule set that is updated through the transceiver.

12. The electronic device according to claim 1, wherein the initial individual comprises a plurality of genes respectively corresponding to a plurality of workstations, wherein the evolution module updates at least one gene among the genes according to the genetic algorithm to generate the first individual.

13. The electronic device according to claim 12, wherein the at least one gene comprises at least one dispatching rule, wherein the evolution module performs mutation on the at least one gene according to the genetic algorithm to update the at least one dispatching rule.

14. The electronic device according to claim 12, wherein the multi-level dispatching rule creation module generates a second initial individual according to the dispatch rule set based on the genetic algorithm, wherein the evolution module performs crossover on the initial individual and the second initial individual to update the at least one gene on the initial individual.

15. The electronic device according to claim 14, wherein the multi-level dispatching rule creation module generates a plurality of initial individuals according to the dispatch rule set based on the genetic algorithm, wherein the initial individuals comprise a first individual set corresponding to high fitness and a second individual set corresponding to low fitness, wherein the evolution module obtains the initial individual from the first individual set and obtains the second initial individual from the second individual set to perform the crossover.

16. The electronic device according to claim 1, wherein the data obtaining module obtains an available resource information through the transceiver, wherein the available resource information comprises at least one of an available workstation, an available dispatching rule of an available workstation, and process working hours, wherein the multi-level dispatching rule creation module generates the initial individual according to the available resource information.

17. The electronic device according to claim 1, wherein the first test data set comprises a work order, wherein the work order comprises workstation scheduling associated with a plurality of workstations.

18. A method of filtering dispatching rules for a workstation, comprising:
  obtaining a dispatch rule set comprising a first dispatching rule and a first test data set;
  generating an initial individual according to the dispatch rule set based on a genetic algorithm;
  generating a first individual according to the first test data set and the initial individual based on the genetic algorithm, wherein the first individual comprises a first dispatching rule sequence corresponding to a first workstation, wherein the first dispatching rule sequence comprises the first dispatching rule;
  calculating a first score corresponding to the first dispatching rule according to a first order of the first dispatching rule in the first dispatching rule sequence, and updating the dispatch rule set according to the first score; and
  outputting the dispatch rule set that is updated.

* * * * *